W. WICKKISER.
Heating-Stove.

No. 166,049. Patented July 27, 1875.

Witnesses
Clarence Thurlow
James Thurlow

Inventor
William Wickkiser
(by Edd. Thurlow
his Atty in Fact)

UNITED STATES PATENT OFFICE.

WILLIAM WICKKISER, OF EL PASO, ILLINOIS.

IMPROVEMENT IN HEATING-STOVES.

Specification forming part of Letters Patent No. 166,049, dated July 27, 1875; application filed May 11, 1875.

*To all whom it may concern:*

Be it known that I, WILLIAM WICKKISER, of El Paso, in the county of Woodford, in the State of Illinois, have invented an Improvement in Stoves or Furnaces for heating air or water; and do hereby declare that the following is a full, clear, and exact description thereof, reference being had to the annexed drawings, making a part of this specification, in which like letters of reference refer to like parts, and in which—

Figure 1:
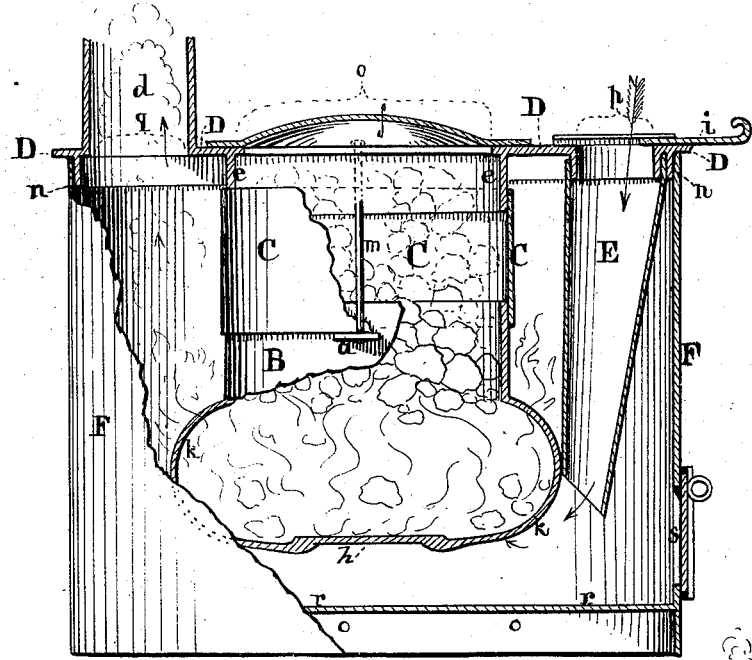
Figure 3:
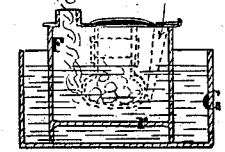
Figure 2:
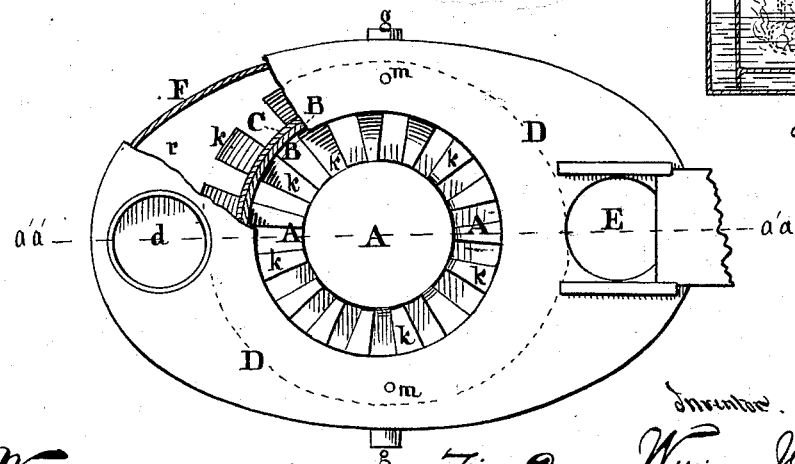

Figure 1 represents a sectional elevation along dotted line $a'\ a'$, Fig. 2; Fig. 2, a plan view, the cover being removed; Fig. 3, a sectional elevation of the stove, combined with agricultural boiler for water-vessel on a smaller scale.

This stove or furnace may be used either for heating rooms or for heating water or food for agricultural purposes by immersion in a vessel, the fire heating the supplied air-draft, which is not in this case admitted through the fuel chamber, but down through the top plate by means of a pipe or air-passage within the stove beneath, furnace-bars arranged in shape of an oblate spheroid, terminating a suspended fuel-chamber, the latter pendent from an upper plate or stove-top.

I am aware that stoves and furnaces for various purposes have been made with a downward draft or convertible draft through the fuel-chamber, or elsewhere, or constructed with fuel-reserve and furnace-bars pendent from the upper plate with covers, &c., which plate fits into the vertical casing of the stove. These furnaces, however, are more or less complicated, few of them being independent of the outer casing, and for this reason are difficult to clean. The castings in my stove will be only the top plate and the grate and its attached cylinder. The construction of my stove adapts it well for immersion in a vessel of water or food for feeding stock, &c.

The first part of my improvement relates to the furnace-bars, which I make circular in plan, in shape an oblate spheroid, composed of bars bowing outward so as to extend the burning fuel beyond the fuel-chamber or reserve (above) in order to allow the heat to approach closely the inclosing-case.

The second part of my improvement consists in the employment of a vertical descending air pipe or passage within the stove-casing, and next to the furnace, to supply heated air, which is regulated by a damper above. The third part of my invention relates to the adaptability of the whole as well to heating houses as to heating water, &c.

In the drawings, A represents the furnace-bars, composed of outwardly-bowed bars $k$ projecting beyond their origin in the fuel-cylinder or coal-reserve B above, and converging beneath the grate either in a small boss or disk or in a circular ring having straight bars $h$ across it. B represents the fuel-holder, which is nothing different from similar chambers in base-burning stoves, &c. It has lugs $a\ a$ (or a flange) by which it is suspended by rods $m\ m$ and nuts from the top plate D. C represents a cylinder of thin iron, being an upward extension of the cylindrical chamber B, by which the latter is connected with the flange $e$, usually employed to connect stoves to their parts. D represents the top or inclosing plate (preferably of an elliptic plan) having a vertical flange, $n$, around its margin, which fits into the casing F, and pierced with three apertures—the larger, $o$, for fuel, having a movable cover, $f$, and opening into the fuel-chamber B; and a smaller opening, $p$, with movable cover $i$ leading into the draft-pipe E; and a third, $q$, for escape of smoke by the pipe $d$. From this plate D are suspended the fuel-chamber and furnace-bars A B, by means of rods $m$ attached to the lugs $a\ a$ on the sides of chamber B, as before described. E represents the draft-pipe attached above to the opening $p$ of plate D, passing thence downward through the heated interior of the stove to the furnace-bars A. F represents the inclosing iron casing, fitting snugly the flange $n$ of the top D, and provided with a bottom, $r$. This casing may have an opening, $s$, at the bottom when used for heating air, for regulating the draft through the pipe E, or for extracting ashes, but is dispensed with, or properly closed by a good luting, packing, or other means for rendering the joints water-tight, when the stove is immersed in water for heating or boiling food for agricultural uses. Convenient fastenings may be used to connect the plate D with the bottom $r$, as rods and nuts, &c., or the represented hooks and staples.

The operation of this stove or furnace is as follows: Fuel is introduced by removing the cover F and filling the cylinders B and C, previously closing the mouth of the pipe E or air-draft, by means of the cover $i$, the cover $f$ is then closed and $i$ opened, the air passing down through the heated space around the furnace-bars to the fire, well heated, for ready combustion, the smoke passing upward through the pipe $d$. In case of using the furnace for heating rooms the aperture at $s$ is used for extracting ashes or regulating the draft through the pipe E.

What I claim as my invention is—

1. The combination, with the stove-case D F provided with air-passage E, with its cover $i$, furnace-cover $f$, and smoke-passage $q$, of the bowed furnace-bars $k$ on cylinder B, with lugs $a$ $a$ and rods $m$ $m$, (connected by cylinder C to the rim $c$ of the cover D, and supported by said rods $m$ $m$,) as described.

2. The combination of the bowed furnace-bars $k$, cylinders B C, cover D, and casing F, having the water-tight door S, and a food caldron or boiler, as and for the purposes described.

In testimony that I claim the foregoing stove, I have hereunto set my hand this 28th day of April, 1875.

WILLIAM WICKKISER.

Witnesses:
JAMES M. MORSE,
JOHN BOWEN.